(12) United States Patent
Kim

(10) Patent No.: US 7,071,414 B2
(45) Date of Patent: Jul. 4, 2006

(54) COVER PLATE FOR ELECTRICAL OUTLETS AND SWITCHES

(76) Inventor: Kyung T. Kim, 24971 Eaton La., Laguna Niguel, CA (US) 92677

( * ) Notice: Subject to any disclaimer, the term of this patent is extended or adjusted under 35 U.S.C. 154(b) by 0 days.

(21) Appl. No.: 11/038,378

(22) Filed: Jan. 18, 2005

(65) Prior Publication Data

US 2005/0181675 A1    Aug. 18, 2005

Related U.S. Application Data

(60) Provisional application No. 60/537,323, filed on Jan. 16, 2004.

(51) Int. Cl.
*H02G 3/14* (2006.01)

(52) U.S. Cl. .................. 174/66; 174/67; 220/241; 220/242; 439/536

(58) Field of Classification Search ............ 174/50, 174/53, 58, 66, 67, 57, 135; 220/3.2, 3.3, 220/3.8, 241, 242; 439/535, 536, 273, 652; D13/156, 177

See application file for complete search history.

(56) References Cited

U.S. PATENT DOCUMENTS

| | | | | |
|---|---|---|---|---|
| 4,835,343 A * | 5/1989 | Graef et al. | .......... | 174/66 |
| 5,003,128 A * | 3/1991 | Grondin | .......... | 174/67 |
| 5,072,848 A * | 12/1991 | Pipis et al. | .......... | 220/241 |
| 5,073,681 A * | 12/1991 | Hubben et al. | .......... | 174/66 |
| 5,675,125 A * | 10/1997 | Hollinger | .......... | 174/66 |
| 5,895,888 A * | 4/1999 | Arenas et al. | .......... | 174/66 |
| 5,955,702 A * | 9/1999 | Grossman et al. | .......... | 174/66 |
| 6,278,062 B1 * | 8/2001 | Sowdon | .......... | 174/66 |

* cited by examiner

Primary Examiner—Angel R. Estrada
(74) Attorney, Agent, or Firm—Knobbe Martens Olson & Bear LLP

(57) ABSTRACT

A cover plate for an electrical outlet or electrical switch unit includes an attachment element having one surface attached to an inside surface of the cover plate and another surface configured to be removably secured to a surface of the outlet or switch unit. Advantageously, this attachment method of the cover plate onto the outlet or switch unit conceals unsightly screws. In one embodiment, the attachment element comprises magnets to connect the cover plate to the outlet or switch unit. In another embodiment, mating VEL-CRO™ portions are used to connect the cover plate to the outlet or switch unit.

24 Claims, 2 Drawing Sheets

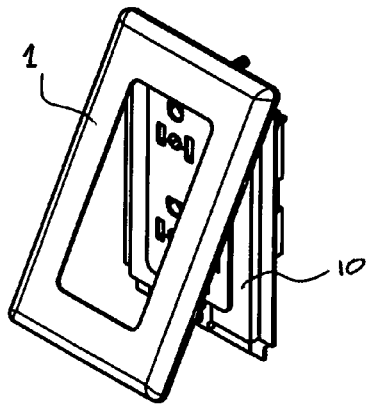
Fig 5 — Decorative cover being installed
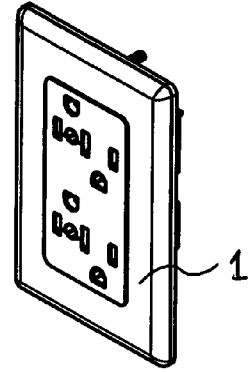
Fig 6 — Decorative cover installed
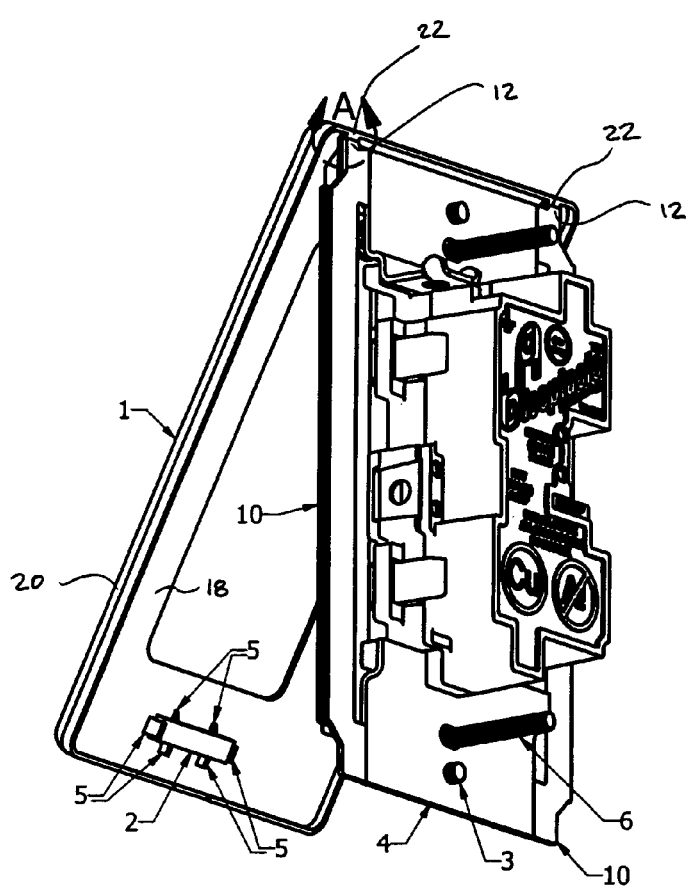
Fig 3
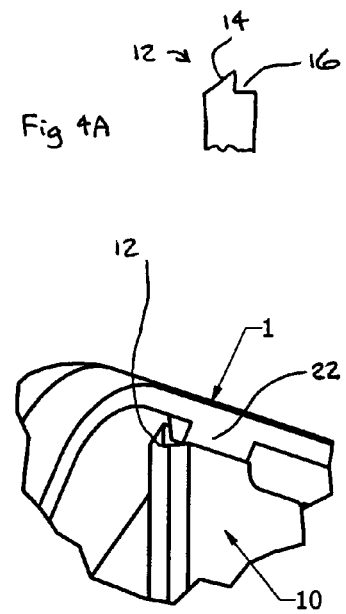
Fig 4A
DETAIL A
Fig 4

COVER PLATE FOR ELECTRICAL OUTLETS AND SWITCHES

CLAIM FOR PRIORITY

This application claims priority to Provisional Application Ser. No. 60/537,323, filed Jan. 16, 2004.

BACKGROUND OF THE INVENTION

1. Field of the Invention

The present invention relates to cover plates for electrical outlets and switch units.

2. Description of the Related Art

Many residential and business consumers appreciate decorative covers for electrical outlets and switches. The covers allow the consumer to hide an unattractive electrical device that must be present to enable modem conveniences.

One common objective of decorative covers for electrical outlets and switches is to hide the screws that secure the device to the wall. U.S. Pat. No. 4,835,343 issued to Graef, et. al. discloses one method of accomplishing this goal, using an adaptor with openings that allow the decorative cover to snap into place. However, this method requires costly manufacturing processes. Thus, there is a need for a more cost-effective decorative cover plate for electrical outlets and switches.

Some outlets and switches include cover plates with edge flange portions adapted to provide a "snap fit" with corresponding elements of the outlet/switch. Typically, one or both of the edge flange portions and corresponding elements are adapted to bend somewhat to engage the cover plate onto the outlet/switch. This configuration is troublesome because it is difficult to remove cover plate. Also, each removal and reengagement of the cover plate onto the outlet/switch produces some bending and fatigue in the edge flange portions and corresponding elements. Repeated removal and reengagement can quickly lead to damage and possibly failure of the edge flange portions and corresponding elements.

SUMMARY OF THE INVENTION

Accordingly, it is a principle advantage of the present invention to overcome some or all of these limitations and to provide an improved cover plate apparatus and method for electrical access units.

In one aspect, the present invention provides a method of attaching a cover plate to an electrical access unit. The method comprises attaching a separately formed attachment element to the cover plate, and removably securing the attachment element of the cover plate to the electrical access unit.

In one embodiment, the surface-to-surface attachment does not require a permanent change to the electrical access unit. In another embodiment, the attachment element can have one or more magnets that become magnetically secured to metal surfaces of the electrical access unit. In a further embodiment, the metal surfaces of the electrical access unit include surfaces of one or more metal plates adhered to one or more elements of the electrical access unit.

In another embodiment, the method further includes aligning an indexing pocket on an inside surface of the cover plate to a metal surface of the electrical access unit, the indexing pocket containing one of the one or more magnets. In a further embodiment, the attachment element is VELCRO™, which can be adhesively attached to the electrical access unit. In another embodiment, the attachment element is reversibly attached to the cover plate. In another embodiment, the electrical access unit has an electricity outlet. In another embodiment, the electrical access unit has a television signal outlet. In another embodiment, the electrical access unit has a telephone signal outlet. In another embodiment, the electrical access unit has a computer network connection. In another embodiment, the electrical access unit has an Internet connection.

In another aspect, the present invention provides a cover plate for an electrical access unit. The cover plate comprises a face plate having an inner surface, and an attachment element attached to the inner surface of the face plate. The attachment element is configured to be removably secured to a surface of an electrical access unit. In one embodiment, the inner surface of the face plate includes an indexing pocket configured to be aligned with an attaching target on the electrical access unit, the indexing pocket containing the attachment element. In a further embodiment, the attachment element has a magnet configured to be magnetically attached and detached to the attaching target, the attaching target comprising a metal surface on the electrical access unit. In another embodiment, the attachment element and the attaching target comprise VELCRO™ tabs. In another embodiment, the attachment element is reversibly attached to the face plate. In another embodiment, the face plate is configured to be attachable to a wall-mounted electrical access unit. In another embodiment, the attaching target comprises one or more screw heads.

In another aspect, the present invention provides a wall-mounted electrical access unit cover plate comprising a face plate and an attachment element mounted to a substantially flat inner surface of the face plate. The attachment element is designed to securely and removably attach to an attaching target of an electrical access unit. In one embodiment, the attachment element is a magnet and the attaching target is metal. In another embodiment, the attachment element and the attaching target comprise a pair of mating VELCRO™ portions. In another embodiment, the cover plate does not contain screw holes. In another embodiment of the invention, the cover plate is decorative.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 3 is a rear isometric view of an electrical outlet cover plate and electrical outlet according to another embodiment of the invention.

FIG. 4 is an enlarged view of a portion of FIG. 3 indicated by arrows A.

FIG. 4A is a side view of an interlock portion of the intermediate plate of the outlet of FIG. 3.

FIGS. 5 and 6 are front isometric views illustrating a method of engaging the cover plate and outlet of FIG. 3.

DETAILED DESCRIPTION OF THE PREFERRED EMBODIMENT

Figure 2:
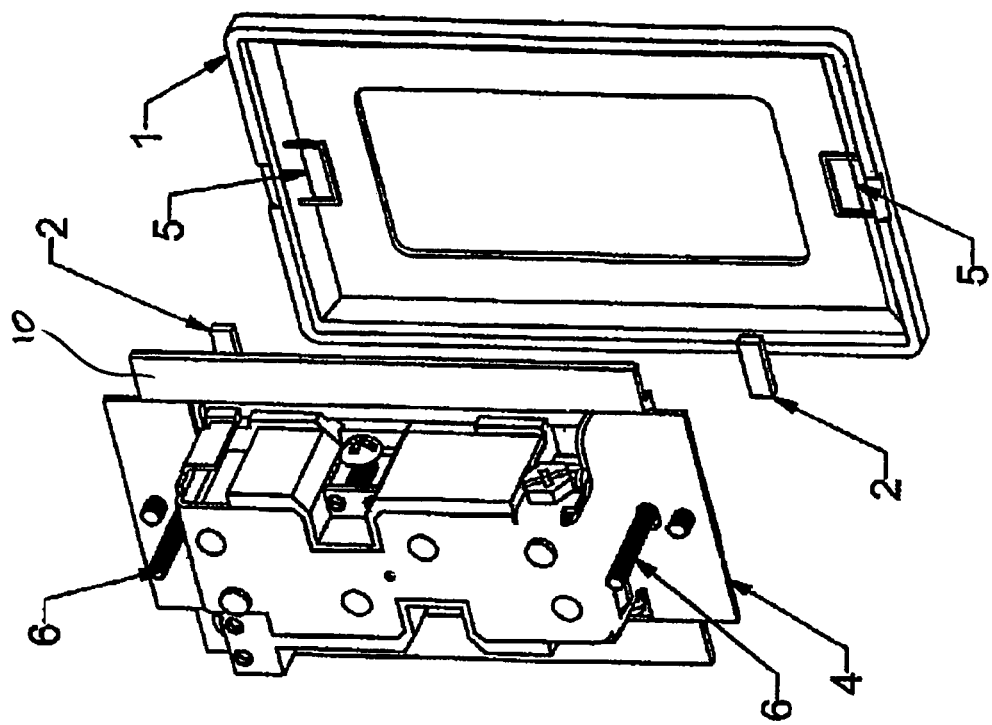
FIG. 2 is a rear isometric view of the elements of FIG. 1.

A method of attaching a cover plate to an electrical outlet or switch unit is provided which allows the user to hide an unattractive device on the outlet or switch unit, such as a screw. As used herein, an "electrical outlet" is an outlet for electricity or for one- or two-way electrical signals. Examples of electrical signals include television signals (e.g., cable TV, satellite TV, etc.), telephone signals, computer network communications (e.g., broadband Internet connections, local and wide area network signals, etc.), and the like. As used herein, a "switch unit" is a unit for controlling electricity or an electrical appliance (e.g., a light switch, fan control box, dimmer switch, etc.). Electrical outlets and switch units are collectively referred to herein as "electrical access units." An electrical access unit is typically mounted onto a wall, with the cover plate generally coplanar with the wall. The present invention also includes electrical access units that are not mounted to walls.

A typical wall-mounted electrical access unit has a mounting yoke attached to the unit and wall by one or more mounting screws. The mounting yoke is then covered by a cover plate that is also screwed on by one or more screws. Often, the screws that mount the cover plate to the mounting yoke are the same screws that mount the mounting yoke to the electrical access unit. The mounting yoke and/or screws are typically metal. However, some outlets and switch units may be manufactured from plastic. The cover plate, whether decorative or functional, can be made less attractive by the screws. Thus, a method and structure for attaching a cover plate to an electrical access unit is provided which conceals the screws (and perhaps other elements) and results in a more attractive access unit.

In one embodiment, the method involves an attachment whereby the cover plate is removably secured to the mounting yoke by an attachment element secured to the plate. Advantageously, there is no need for a permanent or expensive manufacturer's change to the configuration of the mounting yoke and/or cover plate. The method preferably involves a removable yet secure attachment. Preferably, the attachment does not require a forceful locking or snapping action between the cover plate and another element, wherein one part is partially received within another (for example, a male/female attachment). In one embodiment, the method involves aligning a magnetic attachment element with a metallic screw or some other metallic portion of the mounting yoke for the electrical access unit. In a further embodiment, the method involves an attachment element which can be used with any wall-mounted electrical access unit made by the manufacturer without any modification of the configuration of the electrical access unit. In a further embodiment, the surface attachment does not require a permanent change to the mounting yoke. In some embodiments, if a change to the mounting yoke or electrical access unit is required, the change is reversible, i.e., not requiring a permanent modification. For example, a VELCRO™ strip can be adhesively attached to the mounting yoke. In a preferred embodiment, the attachment element is attached to the rear or inner side of the decorative cover plate.

The attachment element is preferably attached to a substantially flat surface of the cover plate. A preferred attachment element comprises one or more magnets that will magnetically stick to a metal portion of the electrical access unit. For example, the magnets can stick to the metallic screws of the mounting yoke, or to metal surfaces of the yoke. Another preferred attachment element is either of the two tabs of a pair of mating VELCRO™ tabs. The attachment element tab is attached to the cover plate, and the other tab is attached to the electrical access unit at a location that is aligned with the attachment element tab when the cover plate is appropriately secured onto the access unit. More than one pair of mating VELCRO™ tabs can be provided. It is to be understood that attachment elements other than magnets or VELCRO™ tabs may be suitable for the disclosed use.

In some embodiments, the electrical access unit contains a mounting yoke which is formed at least partially of metal, such as the plate on the mounting yoke or the screws. In a further embodiment, the screw heads can be flat or rounded. In a further embodiment, rounded screws are replaced with flat screws. In a further embodiment, a mounting yoke constructed of a plastic or non-metal material can have a metal part added by way of an adhesive attachment.

The cover plate can be decorative, configured to hide the screws of the electrical access unit, or can be useful separately from the electrical access unit. In one embodiment, the cover plate is decorated by any method known in the art, including but not limited to: a decorative color, a decorative print, a decorative shape, formation of a material such as ceramic or glass, or provision of reliefs or etchings. In a further embodiment, the cover plate can include labels or text (for example, the label indicates which light, breaker, etc. it activates).

Figure 1:
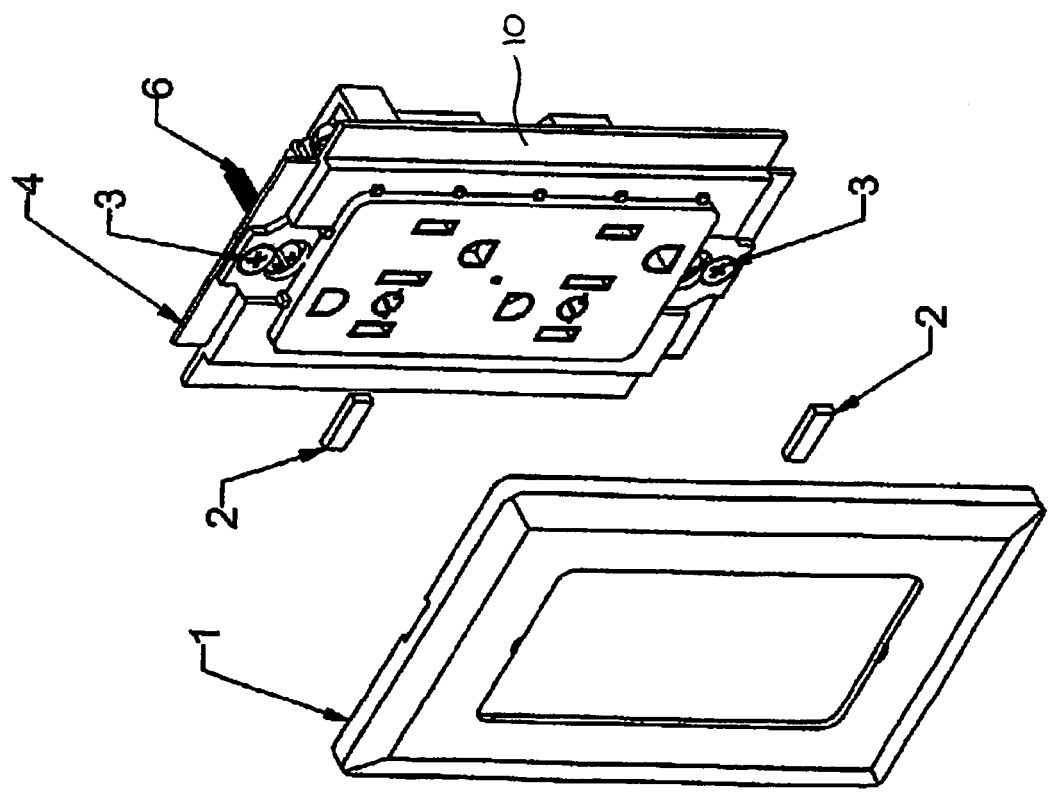
FIG. 1 is a front isometric view of a decorative electrical outlet cover plate and an electrical outlet.

One embodiment of a cover plate and attachment method will now be described with reference to FIGS. 1 and 2, which illustrate a wall-mounted electrical access unit. FIG. 1 shows a wall mounted electrical access unit with a detached cover plate 1 according to one embodiment of the invention. The cover plate 1 shown in FIG. 1 is configured to hide the screws 3 that attach an intermediate plate 10 (typically formed of plastic) to the mounting yoke 4 (also referred to as a "yoke plate"). In the illustrated embodiment, screws 6 attach the yoke plate 4 to the electrical access unit. The mounting yoke 4 is typically metallic. At least one magnet 2 is provided to attach to the flat metal screw head on the mounting yoke 4. While the magnet 2 is shown with a rectangular shape, any size or shape can be used. The magnet need only provide enough surface area to securely attach to the metal screw head. This embodiment allows alignment of the cover plate 1 with the metal screws on the mounting yoke 4. Other embodiments which use a magnet can allow alignment of the cover plate 1 with any metal part of the mounting yoke 4. In the event that a mounting yoke 4 is plastic, embodiments can allow the adhesive attachment of a metal plate to the plastic mounting yoke 4, e.g., using an adhesive backing.

With reference to FIG. 2, the magnets 2 are preferably secured to the inside surface of the cover plate 1 using any method known to one of skill in the art. In a preferred embodiment, two magnets 2 are secured to the inside of the cover plate 1 by any conventional method of adhesion. For example, the magnets 2 could be secured to the cover plate 1 by methods such as adhesive or tape.

Preferably, the magnets are attached within indexing pockets 5 on the inside surface of the cover plate 1 to assure alignment with a target, such as metal screws 3, 6 and/or the metal receptacle mounting yoke 4 of an electrical socket. In a preferred embodiment, the indexing pockets 5 are configured to align the magnets 2 with the placement of the screws 3, 6 and yoke 4 of a standard electrical socket. In one embodiment, the magnet 2 is secured within the indexing pocket 5 using any method known to one of skill in the art, including but not limited to glues and epoxies. One or more magnets 2 can be included which can attach the cover plate 1 to the outlet at one or more contact points. The indexing pocket 5 can be shallow or deep to allow inclusion of a magnet 2 or other attachment.

In another preferred embodiment, the decorative outlet cover plate 1 is attached to the electrical access unit by the use of strips or tabs of VELCRO®, or a similar product, as discussed above. Preferably, the VELCRO® is attached in indexing pockets 5 on the cover plate 1 so as to allow for simple alignment. In a preferred embodiment, the VELCRO® strip or tab (the terms "strip" and "tab" are used interchangeably herein) is pre-attached to the cover plate 1 and a strip is attached as a target on the electrical access unit. The strip can be attached to the cover plate 1 and electrical access unit using any method known to one of skill in the art, including but not limited to adhesive and tape. In one embodiment, the cover plate 1 is commercially packaged with self-adhesive VELCRO® strips to be used as taught herein. In one embodiment, each VELCRO® strip is self-adhesive, i.e., has an adhesive backing protected with a removable plastic backing. In this embodiment, the user can simply remove the plastic backing and attach the one or more VELCRO® strips to the electrical access unit or mounting yoke 4 where desired, preferably so they line up with corresponding mating VELCRO® strips on the cover plate 1. In a further embodiment, the VELCRO® strip can be included on the mounting yoke 4 by the manufacturer. However, this embodiment may be less desirable because it would require a change by the manufacturer. One or more VELCRO® strips can be used to attach the cover plate 1 to the electrical access unit at one or more contact points.

FIGS. 3–6 illustrate another embodiment of the present invention. FIG. 3 shows a cover plate 1 and an associated electrical outlet that is similar to that of FIGS. 1 and 2, except as indicated herein. The outlet includes an intermediate plate 10 (similar to the plate 10 of the previous embodiment), which is typically formed of plastic. The intermediate plate 10 includes two interlock elements 12 in its upper corners. As shown in FIGS. 4 (labeled "DETAIL A") and 4A, each interlock element 12 includes a tapered upper surface 14 and a notch 16. In other aspects, the intermediate plate 10 is similar to the plate 10 of FIGS. 1 and 2.

The cover plate 1 is adapted to engage the intermediate plate 10. The cover plate 1 includes a flat portion 18 surrounded by an edge wall 20. The cover plate 1 also includes two upper flange portions 22 descending from the edge wall 20. As shown in FIG. 4, each flange portion 22 is configured to engage a notch 16 of one of the interlock elements 12 of the intermediate plate 10. The cover plate 1 also includes an indexing pocket 5 adapted to be aligned with the head of a lower screw 3 for mounting the intermediate plate 10 to the yoke plate 4. The indexing pocket 5 includes an attached magnet 2, as in the previously illustrated embodiment. The magnet 2 magnetically engages the screw head (or any metallic surface of, e.g., the yoke plate 4, a metallic element on the outlet, etc.) to cause the cover plate 1 to be secured to the outlet. It will be understood that the magnetic engagement can be replaced by mating VELCRO® tabs or strips. When the magnet 2 is engaged in this way, the flange portions 22 are engaged within the notches 16 of the interlock elements 12, as shown in FIG. 4.

With reference to FIGS. 5 and 6, engagement of the cover plate 1 to the intermediate plate 10 is now described. First, the top edge of the cover plate 1 is aligned with the top of the intermediate plate 10, as shown in FIG. 5. In doing so, the flange portions 22 should be received within the notches 16 of the interlock elements 12, as shown in FIG. 4. Then, the cover plate 1 is rotated downward about the interlock elements 12 until the magnet 2 (or VELCRO® tab) becomes secured to a corresponding surface of the outlet. It will be understood that the cover plate 1 and the outlet can be configured so that the plate 1 pivots or rotates about any desired edge of the outlet. For example, the interlock elements 12 and flange portions 22 can be provided on the side or on the bottom, with the magnet or VELCRO® tabs on the opposite end.

An advantage of the embodiment of FIGS. 3–6 is that the cover plate 1 can conveniently engaged and removed from the outlet (or any type of electrical access unit) without damaging the flange portions 22 and interlock elements 12. There is no snapping action that can produce fatigue and possibly failure of such portions.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein, but instead by reference to claims attached hereto.

What is claimed is:

1. A method of attaching a cover plate to an electrical access unit, the method comprising:

attaching a separately formed attachment element to the cover plate;

engaging a flange portion on an edge of the cover plate with a notch on an edge of the electrical access unit;

while the flange portion is engaged with the notch, pivoting the cover plate about the edge of the electrical access unit so that the cover plate pivots toward the electrical access unit; and removably securing the attachment element of the cover plate to the electrical access unit;

wherein the cover plate is selectively attachable and detachable with respect to the electrical access unit.

2. The method of claim 1, wherein said attachment element comprises one or more magnets that become magnetically secured to metal surfaces of the electrical access unit.

3. The method of claim 2, wherein the metal surfaces of the electrical access unit comprise surfaces of one or more metal plates adhered to one or more elements of the electrical access unit.

4. The method of claim 2, further comprising aligning an indexing pocket on an inside surface of the cover plate to a metal surface of the electrical access unit, the indexing pocket containing one of the one or more magnets.

5. The method of claim 1, wherein said attachment element comprises one of a fabric of small hooks and a fabric of small loops.

6. The method of claim 5, wherein said fabric is adhesively attached to the electrical access unit.

7. The method of claim 1, wherein said attachment element is reversibly attached to the cover plate.

8. The method of claim 1, wherein the electrical access unit comprises an electricity outlet.

9. The method of claim 1, further comprising, substantially simultaneously with said engaging the flange portion with the notch, engaging a second flange portion on the edge of the cover plate with a second notch on the edge of the electrical access unit.

10. A cover plate for an electrical access unit, comprising:
a face plate having a substantially flat inner surface and a flange portion on an edge of the face plate, the flange portion configured to engage a notch on an edge of an electrical access unit so that the face plate can pivot about the edge of the electrical access unit while the flange portion engages the notch; and
an attachment element attached to the inner surface of the face plate, the attachment element configured to be removably secured to a substantially flat surface of the electrical access unit;
wherein the face plate is selectively attachable and detachable with respect to the electrical access unit.

11. The cover plate of claim 10, wherein the inner surface of the face plate includes an indexing pocket configured to be aligned with an attaching target on the electrical access unit, said indexing pocket containing the attachment element.

12. The cover plate of claim 10, wherein the attachment element comprises a magnet configured to be magnetically attached and detached with respect to a metal surface on the electrical access unit.

13. The cover plate of claim 10, wherein the attachment element is configured to be removably secured to an attaching target on the substantially flat surface of the electrical access unit, and wherein one of the attachment element and the attaching target comprises a fabric of small hooks and the other of the attachment element and the attaching target comprises a fabric of small loops, the hooks and loops being configured to stick together.

14. The cover plate of claim 10, wherein the attachment element is reversibly attached to the face plate.

15. The cover plate of claim 10, wherein the substantially flat surface of the electrical access unit comprises one or more screw heads.

16. The cover plate of claim 10, wherein the face plate includes a second flange portion on the edge of the face plate, the second flange portion configured to engage a second notch on the edge of the electrical access unit so that the face plate can pivot about the edge of the electrical access unit while the flange portions engage the notches.

17. A wall-mounted electrical access unit cover plate, comprising a face plate and an attachment element mounted to a substantially flat inner surface of the face plate, the attachment element designed to securely and removably attach to an attaching target of an electrical access unit, the face plate having an edge with a flange portion configured to engage a notch on an edge of the electrical access unit so that the face plate can pivot about the edge of the electrical access unit while the flange portion engages the notch, the cover plate being selectively attachable and detachable with respect to the electrical access unit.

18. The cover plate of claim 17, wherein the attachment element is a magnet and the attaching target is metal.

19. The cover plate of claim 17, wherein one of the attachment element and the attaching target comprises a fabric of small hooks and the other of the attachment element and the attaching target comprises a fabric of small loops, the hooks and loops being configured to stick together.

20. The cover plate of claim 17, wherein the cover plate does not contain screw holes.

21. The cover plate of claim 17, wherein the edge of the face plate includes a second flange portion configured to engage a second notch on the edge of the electrical access unit.

22. A method of attaching a cover plate to an electrical access unit, the method comprising:
attaching a separately formed attachment element to the cover plate, the attachment element comprising one or more magnets configured to become magnetically secured to metal surfaces of the electrical access unit;
engaging a flange portion on an edge of the cover plate with an interlock element on an edge of the electrical access unit;
while the flange portion is engaged with the interlock element, pivoting the cover plate about the edge of the electrical access unit so that the cover plate pivots toward the electrical access unit;
removably securing the attachment element of the cover plate to the electrical access unit; and
aligning an indexing pocket on an inside surface of the cover plate to a metal surface of the electrical access unit, the indexing pocket containing one of the one or more magnets;
wherein the cover plate is selectively attachable and detachable with respect to the electrical access unit.

23. A method of attaching a cover plate to an electricity outlet, the method comprising:
attaching a separately formed attachment element to the cover plate;
engaging a flange portion on an edge of the cover plate with an interlock element on an edge of the electricity outlet;
while the flange portion is engaged with the interlock element, pivoting the cover plate about the edge of the electricity outlet so that the cover plate pivots toward the electricity outlet; and
removably securing the attachment element of the cover plate to the electricity outlet;
wherein the cover plate is selectively attachable and detachable with respect to the electricity outlet.

24. A cover plate for an electrical access unit, comprising:
a face plate having a substantially flat inner surface and a flange portion on an edge of the face plate, the flange portion configured to engage an interlock element on an edge of an electrical access unit so that the face plate can pivot about the edge of the electrical access unit while the flange portion engages the interlock element; and an attachment element attached to the inner surface of the face plate, the attachment element configured to be removably secured to a substantially flat surface of the electrical access unit;

wherein the face plate is selectively attachable and detachable with respect to the electrical access unit, the inner surface of the face plate including an indexing pocket configured to be aligned with an attaching target on the electrical access unit, said indexing pocket containing the attachment element.

* * * * *